US011935255B2

(12) United States Patent
Horikawa et al.

(10) Patent No.: US 11,935,255 B2
(45) Date of Patent: Mar. 19, 2024

(54) DISPLAY APPARATUS

(71) Applicant: FUJIFILM Business Innovation Corp., Tokyo (JP)

(72) Inventors: Kazuhiko Horikawa, Kanagawa (JP); Masaru Okutsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 181 days.

(21) Appl. No.: 16/882,756

(22) Filed: May 26, 2020

(65) Prior Publication Data

US 2021/0132890 A1 May 6, 2021

(30) Foreign Application Priority Data

Oct. 31, 2019 (JP) ................................. 2019-198852

(51) Int. Cl.
| | |
|---|---|
| *G06T 15/50* | (2011.01) |
| *G06F 3/147* | (2006.01) |
| *G06T 7/507* | (2017.01) |
| *G06T 7/586* | (2017.01) |
| *G06T 15/20* | (2011.01) |
| *G06T 19/00* | (2011.01) |
| *H04N 1/10* | (2006.01) |
| *H04N 23/698* | (2023.01) |

(52) U.S. Cl.
CPC .............. *G06T 7/507* (2017.01); *G06F 3/147* (2013.01); *G06T 7/586* (2017.01); *G06T 15/50* (2013.01); *G06T 15/506* (2013.01); *G06T 19/00* (2013.01); *H04N 1/10* (2013.01); *H04N 23/698* (2023.01)

(58) Field of Classification Search
CPC ...... G06F 3/04815; G06F 3/011; G06F 3/147; G06T 19/006; G06T 7/586; G06T 7/70; G06T 7/507; G06T 7/55; G06T 1/0007; G06T 19/00; G06T 19/20; G06T 13/40; G06T 15/60; G06T 15/506; G06T 15/50; G06T 19/003; H04N 23/45; H04N 23/62; H04N 13/111; H04N 23/69; H04N 23/695; H04N 23/698
See application file for complete search history.

(56) References Cited

U.S. PATENT DOCUMENTS

| | | | |
|---|---|---|---|
| 10,606,545 B2 | 3/2020 | Kuwada et al. | |
| 2009/0128552 A1* | 5/2009 | Fujiki | G06T 19/006 345/419 |

(Continued)

FOREIGN PATENT DOCUMENTS

JP 2019082838 5/2019

*Primary Examiner* — Dismery Mercedes
(74) *Attorney, Agent, or Firm* — JCIPRNET

(57) ABSTRACT

A display apparatus includes a generation unit that generates generation images when a certain object is viewed at a plurality of angles such that an angle of the object with respect to a virtual light source is changed on the basis of an image of the object, a selection unit that selects a first image in which the object is viewed at a first angle from among the generation images, as a selection image, a conversion unit that converts the first image into a conversion image in which the object is viewed at a second angle that is different from the first angle in a state in which a positional relationship between the virtual light source and the object in the first image is maintained, and a display unit that displays the conversion image.

12 Claims, 17 Drawing Sheets

(56) References Cited

U.S. PATENT DOCUMENTS

| | | | |
|---|---|---|---|
| 2009/0279807 A1* | 11/2009 | Kanamorl | G02B 5/3025 |
| | | | 348/222.1 |
| 2010/0002006 A1* | 1/2010 | Mauchly | H04N 13/398 |
| | | | 345/581 |
| 2010/0033631 A1* | 2/2010 | Tsai | G09G 5/14 |
| | | | 348/559 |
| 2011/0102551 A1* | 5/2011 | Iwasaki | G06T 3/40 |
| | | | 348/46 |
| 2013/0113701 A1* | 5/2013 | Sasaki | G06T 15/20 |
| | | | 345/156 |
| 2013/0156259 A1* | 6/2013 | Hirano | G06T 3/0006 |
| | | | 382/100 |
| 2014/0192164 A1* | 7/2014 | Tenn | H04N 13/243 |
| | | | 348/47 |
| 2015/0355867 A1* | 12/2015 | Yoshida | G06F 3/14 |
| | | | 358/1.15 |
| 2017/0192219 A1* | 7/2017 | Kato | H04N 23/74 |
| 2018/0247393 A1* | 8/2018 | Ohga | G06T 15/205 |
| 2019/0080509 A1* | 3/2019 | Bianco | G06T 15/506 |
| 2019/0164335 A1* | 5/2019 | Sheffield | G06T 17/00 |
| 2019/0260947 A1* | 8/2019 | Imazu | H04N 23/69 |
| 2020/0279123 A1* | 9/2020 | Takenaka | A61H 3/061 |

* cited by examiner

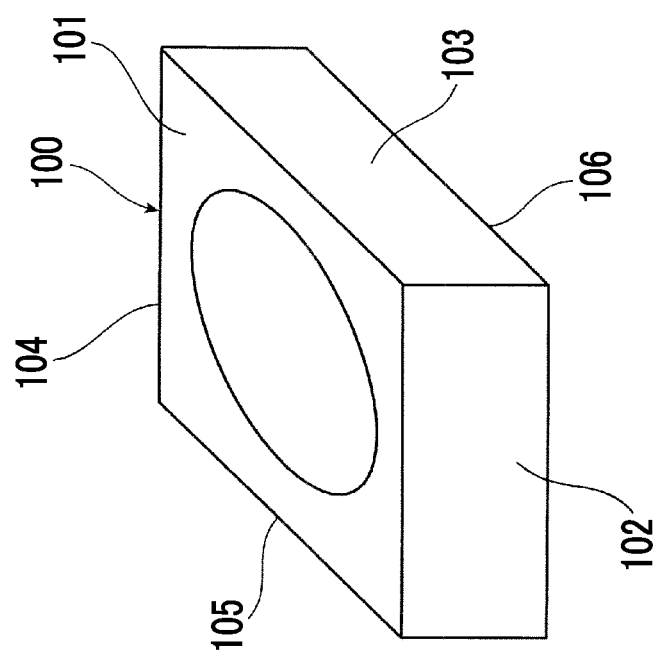
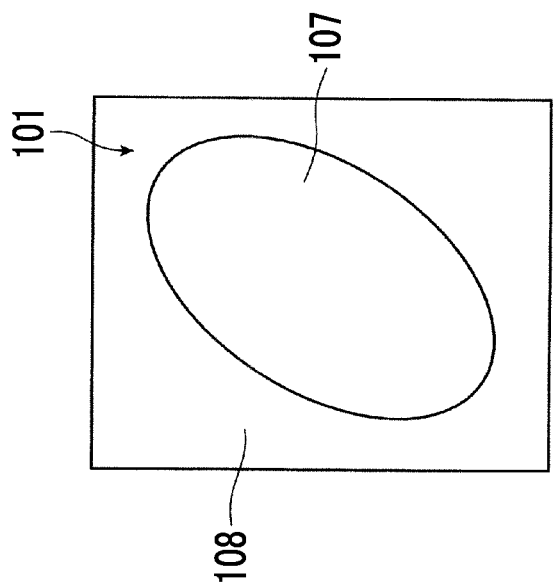
FIG. 20A
FIG. 20B

DISPLAY APPARATUS

CROSS-REFERENCE TO RELATED APPLICATIONS

This application is based on and claims priority under 35 USC 119 from Japanese Patent Application No. 2019-198852 filed Oct. 31, 2019.

BACKGROUND

(i) Technical Field

The present invention relates to a display apparatus.

(ii) Related Art

In the related art, as a technique related to a display apparatus, for example, JP2019-082838A has proposed a display apparatus.

JP2019-082838A discloses a display apparatus configured to include a diffuse reflection image acquisition unit that acquires a diffuse reflection image of an object surface; a specular reflection image acquisition unit that acquires a specular reflection image of the object surface; a difference image acquisition unit that acquires a difference image between the diffuse reflection image and the specular reflection image; a reflectance distribution function calculation unit that calculates a reflectance distribution function of the object surface by using the diffuse reflection image and the difference image; and a display unit that displays a reflection color of the object surface corresponding to a change in an orientation of the object surface by using the reflectance distribution function.

SUMMARY

Aspects of non-limiting embodiments of the present disclosure relate to a display apparatus that displays an image in which an image is viewed at another angle in a state in which a positional relationship between a virtual light source and the object is maintained.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a display apparatus including a generation unit that generates generation images when a certain object is viewed at a plurality of angles such that an angle of the object with respect to a virtual light source is changed on the basis of an image of the object; a selection unit that selects a first image in which the object is viewed at a first angle from among the generation images, as a selection image; a conversion unit that converts the first image into a conversion image in which the object is viewed at a second angle that is different from the first angle in a state in which a positional relationship between the virtual light source and the object in the first image is maintained; and a display unit that displays the conversion image.

BRIEF DESCRIPTION OF THE DRAWINGS

Exemplary embodiment(s) of the present invention will be described in detail based on the following figures, wherein:

FIGS. 20A and 20B are explanatory diagrams illustrating an image of the object;

DETAILED DESCRIPTION

Hereinafter, exemplary embodiments of the present invention will be described with reference to the drawings.

Exemplary Embodiment 1

Figure 1:
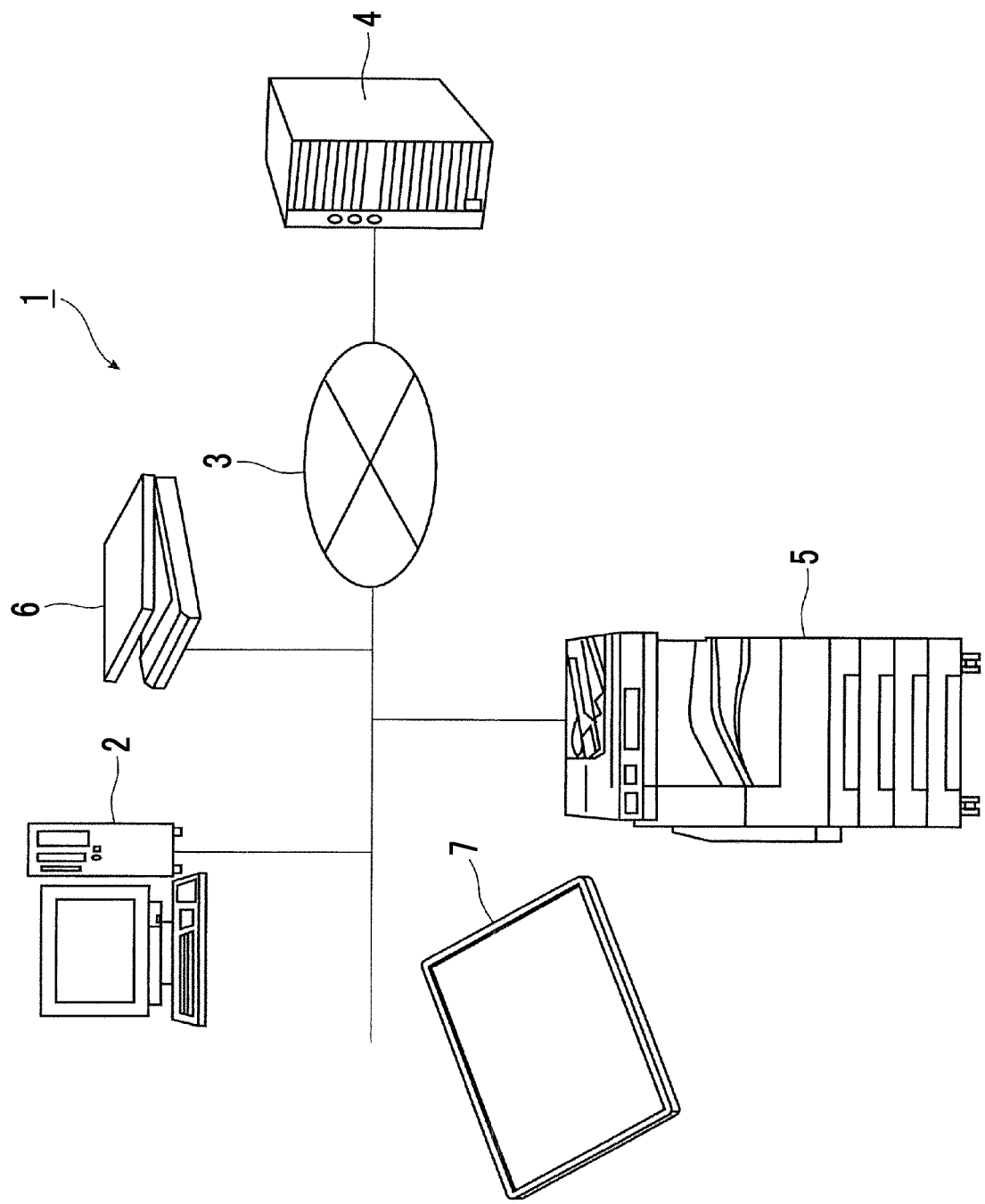
FIG. 1 is a schematic configuration diagram illustrating an image display system to which a display apparatus according to Exemplary Embodiment 1 of the present invention is applied.

FIG. 1 illustrates an image display system to which a display apparatus according to Exemplary Embodiment 1 is applied.

Overall Configuration of Image Display System Using Display Apparatus

In order to achieve on-demand printing, an on-demand printer or the like may print images in various colors that change depending on changes in light, viewing angles, or viewing persons, such as images of shells, wings of butterflies or dragonflies, bands woven with gold threads or silver threads, or Japanese paintings drawn with gold foils or silver foils.

Consequently, a display apparatus displaying an image is also required to be able to display a texture of an object surface such as a glossy feeling or a rugged feeling.

An image display system 1 to which a display apparatus according to Exemplary Embodiment 1 is applied may include, as illustrated in FIG. 1, a user terminal apparatus 2 as an example of a display apparatus that can display an object giving a glossy feeling or a rugged feeling by using three-dimensional computer graphics (3DCG); a tablet terminal apparatus 7 as an example of a display apparatus that can perform communication via a wireless LAN (not illustrated) and can display an object giving a glossy feeling or a rugged feeling by using the same 3DCG; a server apparatus 4 that is connected to the user terminal apparatus 2 or the tablet terminal apparatus 7 via a network 3; a texture scanner 6 as an example of an image reading apparatus that reads an image of an object giving a glossy feeling or a rugged feeling; and an image forming apparatus 5 that prints image information as necessary.

The user terminal apparatus 2 is configured with, for example, a personal computer. However, the user terminal apparatus 2 is not limited to the personal computer, and may be a computer including one or plural processors, a memory, an input/output interface, a communication interface, and a display unit.

Figure 2:
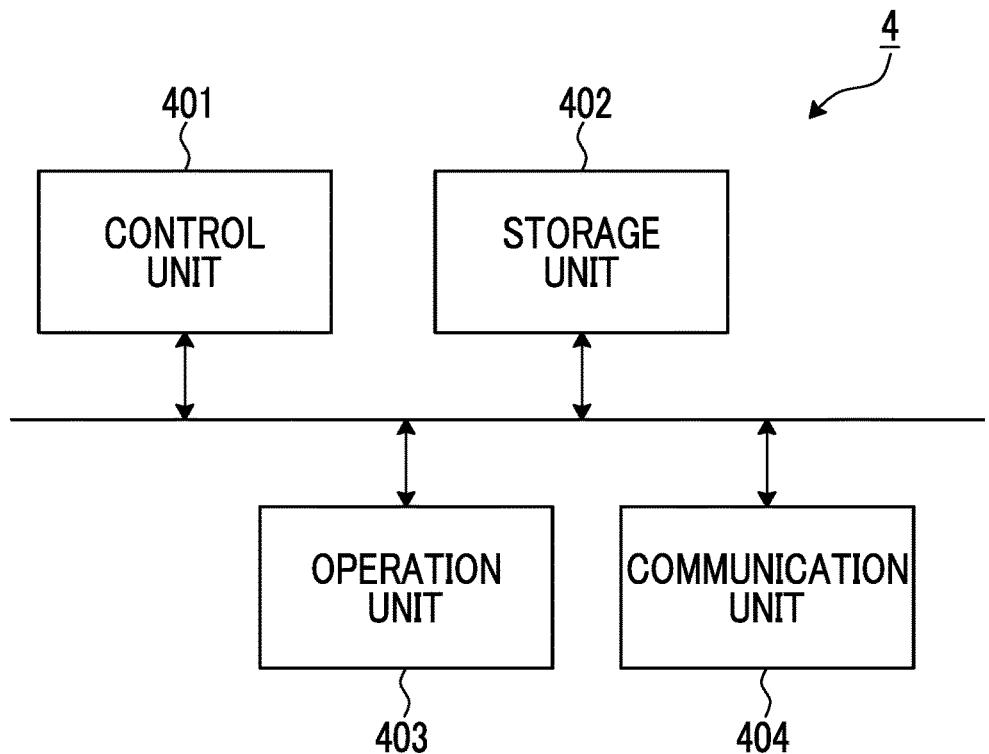
FIG. 2 is a block diagram illustrating a server apparatus.

FIG. 2 is a block diagram illustrating the server apparatus 4 to which the image display system 1 according to Exemplary Embodiment 1 is applied.

As illustrated in FIG. 2, the server apparatus 4 includes a control unit 401 as an example of control means, a storage unit 402, an operation unit 403, and a communication unit 404.

The control unit 401 has a central processing unit (CPU), a read only memory (ROM), and a random access memory (RAM). The control unit 401 executes read-out or read-in of a database or the like including plural pieces of 3DCG data created according to a 3DCG program stored in the storage unit 402 including a hard disk or the like. The control unit 401 controls the storage unit 402, the operation unit 403, or the communication unit 404, and is also connected to the user terminal apparatus 2, the tablet terminal apparatus 7, the texture scanner 6, or the image forming apparatus 5 via the communication unit 404 and the network 3.

Figure 3:
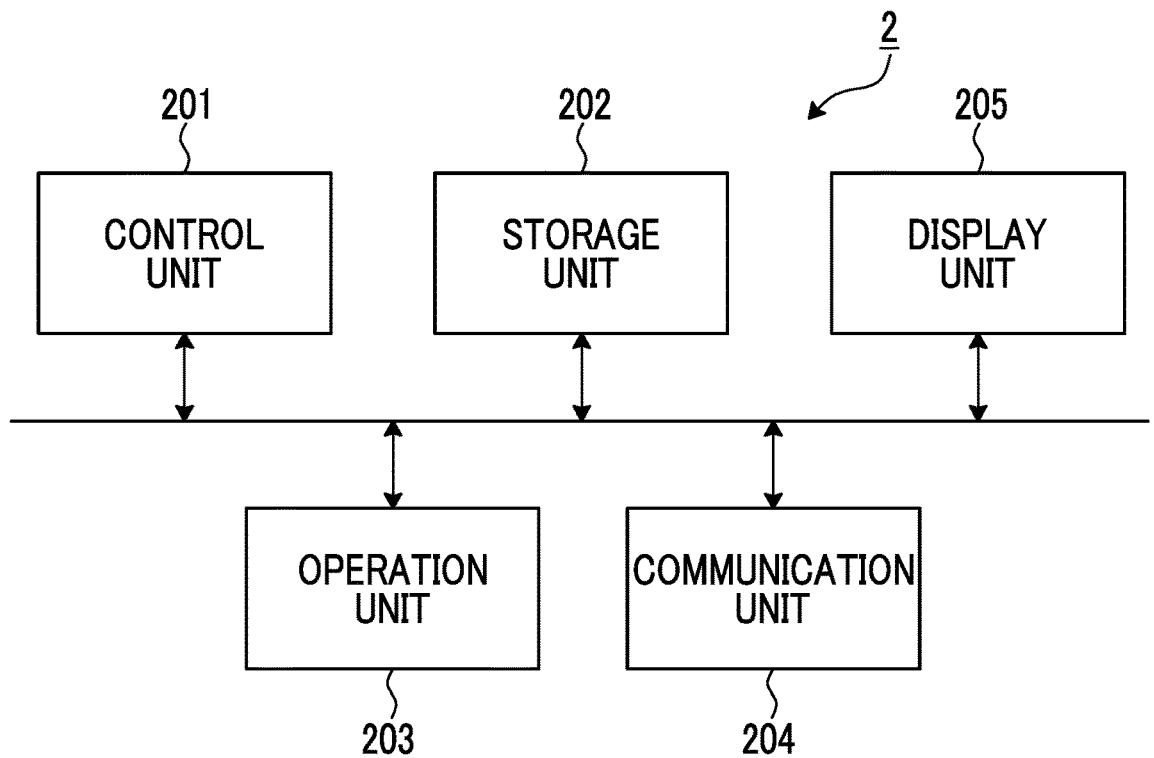
FIG. 3 is a block diagram illustrating a user terminal apparatus.

FIG. 3 is a block diagram illustrating the user terminal apparatus as an example of a display apparatus in the image display system 1 according to Exemplary Embodiment 1. The tablet terminal apparatus 7 is also fundamentally configured in the same manner as the user terminal apparatus 2 illustrated in FIG. 3.

As illustrated in FIG. 3, the user terminal apparatus 2 includes a control unit 201 as an example of control means, a storage unit 202, an operation unit 203, a communication unit 204, and a display unit 205.

The control unit 201 has a central processing unit (CPU), a read only memory (ROM), and a random access memory (RAM). The control unit 201 executes read-out from the server apparatus 4 or executes a 3DCG program or the like stored in advance in the storage unit 202 including a hard disk or the like, and also executes various functions as a display apparatus. The control unit 201 controls the storage unit 202, the operation unit 203, the communication unit 204, or the display unit 205, and performs transmission and reception of data with the server apparatus 4 and the image forming apparatus 5 via the communication unit 204.

Figure 4:
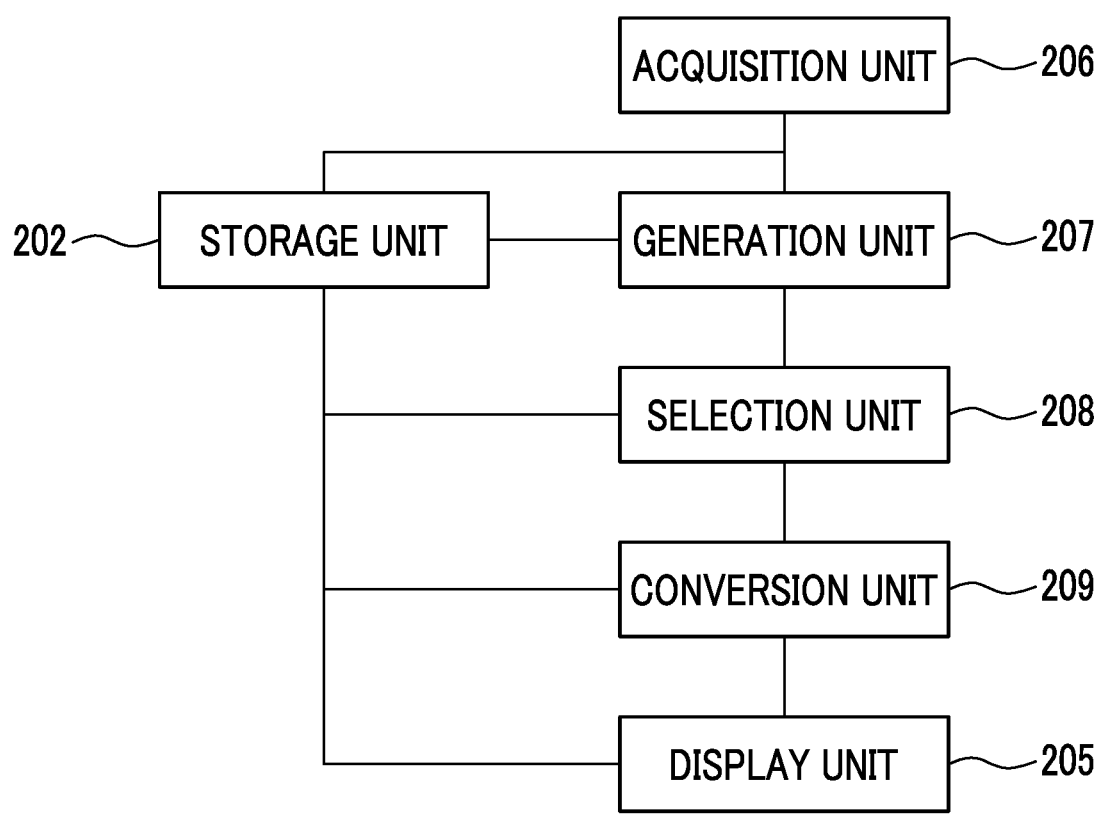
FIG. 4 is a block diagram illustrating constituents of the display apparatus according to Exemplary Embodiment 1 of the present invention.

As illustrated in FIG. 4, the control unit 201 functions as an acquisition unit 206 that acquires image information of an object; a generation unit 207 that generates images of the object, corresponding to generation images in the present exemplary embodiment, when the object is viewed at a plurality of angles such that an angle of the object for a virtual light source is changed on the basis of an image of the object; a selection unit 208 that selects an image of the object, corresponding to a selection image in the present exemplary embodiment, viewed at a first angle among the images of the object generated by the generation unit 207; and a conversion unit 209 that converts the image of the object selected by the selection unit 208 into an image of the object, corresponding to a conversion image in the present exemplary embodiment, viewed at a second angle that is different from the first angle in a state in which a positional relationship between the virtual light source and the object is maintained. The image of the object obtained through the conversion in the conversion unit 209 is displayed on the display unit 205. The display unit 205 of the present exemplary embodiment displays not only a conversion image but also a generation image, and thus a selection image is selected while viewing the display unit 205 even in a case where a selection image is displayed on the display unit 205.

Figure 5:
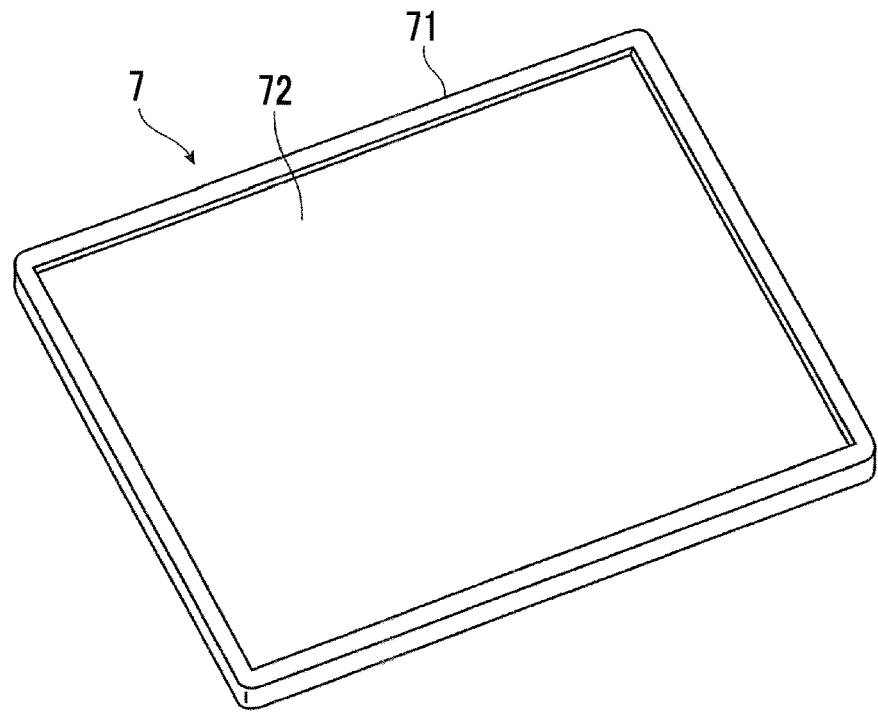
FIG. 5 is a perspective configuration view illustrating a tablet terminal apparatus.

The selection unit 208 is configured with a keyboard or a mouse as an example of the operation unit 203 of the user terminal apparatus 2. The display unit 205 is configured with a liquid crystal display or an organic EL display of the user terminal apparatus 2. As illustrated in FIG. 5, the tablet terminal apparatus 7 includes a display unit 71 configured with a liquid crystal display or an organic EL display in the same manner as the display unit 205 of the user terminal apparatus 2, but a touch panel 72 as an example of an operation unit that is operated by a user touching the touch panel 72 with a finger is provided on a front surface of the display unit 71.

A configuration of the user terminal apparatus 2 as an example of a display apparatus will be described later in detail.

Figure 6:
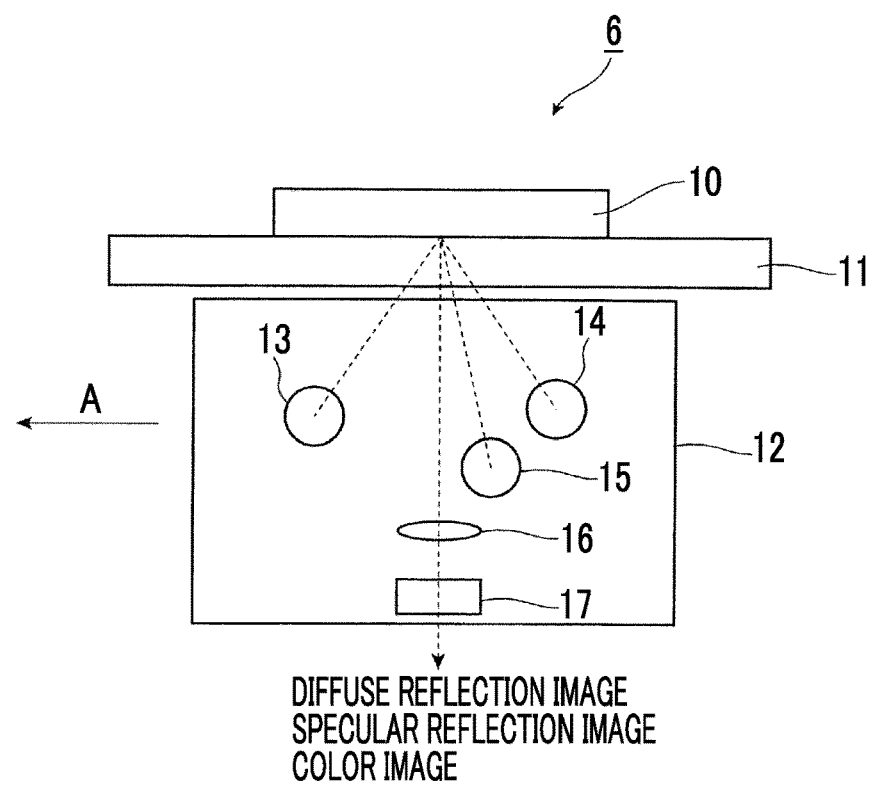
FIG. 6 is a configuration diagram illustrating a texture scanner.

FIG. 6 is a configuration diagram illustrating a texture scanner as an example of an image reading apparatus acquiring an image of a planar object.

As illustrated in FIG. 6, the texture scanner 6 optically reads surface characteristics of a planar object 10 as an example of an object, and outputs an image signal (image data) as a reading result. The image signal output from the texture scanner 6 includes not only a color image signal for the planar object 10 but also a diffuse reflection image signal based on diffusely reflected light and a specular reflection image signal based on specularly reflected light.

The texture scanner 6 is provided with a platen glass 11 including a transparent glass plate or the like on which the planar object 10 is mounted at an upper end part thereof. The texture scanner 6 may be provided with a platen cover (not illustrated) that blocks external light by covering the planar object 10 mounted on the platen glass 11. A carriage 12 that is movable in a direction indicated by an arrow A along a surface of the platen glass 11 is provided under the platen glass 11. The carriage 12 is mounted with, for example, first light sources 13 and 14 used to read a color image and a diffuse reflection image, a second light source 15 used to read a specular reflection image, an imaging optical system 16 including an imaging lens or a mirror (not illustrated), and a sensor 17.

Members such as the first and second light sources 13, 14, and 15, the sensor 17, and the carriage 12 are provided with predefined widths along perpendicular to the drawing surface in the texture scanner 6. The direction perpendicular to the drawing surface is a main scanning direction of the texture scanner 6. The direction indicated by the arrow A is a sub-scanning direction of the texture scanner 6 that is a movement direction of the carriage 12.

When an image of the planar object 10 is read, the carriage 12 is configured to be moved along the sub-scanning direction A at a predefined reading speed. The first light source 13 is a front side light source, and applies light at an incidence angle of, for example, 45° that is a first incidence angle with respect to a normal direction at a reading position of the planar object 10 such that diffusely reflected light from the planar object 10 is read by the sensor 17. The first light source 14 is a rear side light source, and applies light at an incidence angle of, for example, 45° with respect to the normal direction to the planar object 10 such that diffusely reflected light from the planar object 10 is read. The second light source 15 is a rear side light source, and applies light at an incidence angle of, for example, 10° that is a second incidence angle with respect to the normal direction at the reading position of the planar object 10 such that specularly reflected light from the planar object 10 is read.

The second light source 15 is provided at a position where a main light beam of the reflected light is not blocked. An incidence angle of light applied from the second light source 15 is set to 10° in Exemplary Embodiment 1. This is only an example, and an incidence angle of light applied from the second light source 15 may be set to a small angle such as about 5° to 10°. Reflected light of light applied from the second light source 15 travels in the normal direction at the reading position of the planar object 10, and is read by the sensor 17 via the imaging optical system 16 such as an imaging lens.

It is desirable that an angle of light applied from the second light source 15, for example, is small. In a case where an angle of light applied from the second light source 15 is relatively large, a cover or the like restricting the angle of light applied from the second light source 15 may be provided. The second light source 15 is used to read gloss information based on specular reflection at the planar object 10, and thus, for example, it is desirable that the luminance thereof is as uniform and continuous as possible in the main scanning direction compared with the luminance of the first light sources 13 and 14.

For example, a fluorescent lamp or a rare gas fluorescent lamp (such as a xenon fluorescent lamp) is used as alight source satisfying the requirements of the second light source 15. As the second light source 15, a light source may be used in which a plurality of white LEDs are arranged in the main scanning direction, and a luminance distribution in the main scanning direction is made uniform by using a diffusion plate or the like.

The carriage 12 is further provided with the imaging optical system 16 and the sensor 17 inside thereof. The imaging optical system 16 is configured with a reflection mirror or an imaging lens, and images diffusely reflected light and specularly reflected light components from the planar object 10. The sensor 17 receives the diffusely reflected light and specularly reflected light components imaged by the imaging optical system 16, and generates image signals corresponding to the received light. The sensor 17 is configured with a light receiving element such as a CCD linear image sensor or a CMOS image sensor, and converts received light into a signal representing the intensity thereof. The sensor 17 is provided with a color filter selectively attached and detached and including RGB, and generates a color image signal representing a color of the planar object 10. In addition to the color image signal, the sensor 17 outputs a diffuse reflection image signal obtained by receiving the diffusely reflected light and a specular reflection image signal obtained by receiving the specularly reflected light to an external apparatus such as the user terminal apparatus 2, the tablet terminal apparatus 7, or the server apparatus 4 via the network 3.

The texture scanner 6 scans the planar object 10 mounted on the platen glass 11, for example, three times, and thus separately outputs the color image signal, the diffuse reflection image signal, and the specular reflection image signal. The output of the color image signal is performed by attaching the color filter to the sensor 17 and illuminating the planar object 10 mounted on the platen glass 11 with the first light sources 13 and 14. The output of the diffuse reflection image signal is performed by detaching the color filter from the sensor 17 and illuminating the planar object 10 mounted on the platen glass 11 with the first light sources 13 and 14. The output of the specular reflection image signal is performed by detaching the color filter from the sensor 17 and illuminating the planar object 10 mounted on the platen glass 11 with the second light source 15.

A diffuse reflection condition (light source incidence angle of 45°) and a specular reflection condition (light source incidence angle of 10°) are calibrated by using the same white calibration plate. Thus, in a case where only diffusely reflected light is generated from the planar object 10 mounted on the platen glass 11 and specularly reflected light is not generated therefrom, output signals from the sensor 17 are the same as each other, and thus gloss information may be extracted through simple difference calculation.

Meanwhile, an image of the planar object 10 read by the texture scanner 6 may include not only a normal text image or an image such as a picture or an illustration but also an image of an object having a glossy or rugged surface.

There is a printer that can form a glossy image using silver or gold metallic colors and yellow, magenta, cyan, and black (YMCK) color toner, or a printer that can impart gloss by placing transparent toner on color toner or can perform printing in which a glossy expression is increased by using a cooling device such as an iron after fixing toner.

As illustrated in FIG. 6, image information of an object having a glossy or rugged surface is obtained by acquiring image data of a diffuse reflection image and a specular reflection image in addition to a color image of the planar object 10 by using the texture scanner 6.

Figure 7:
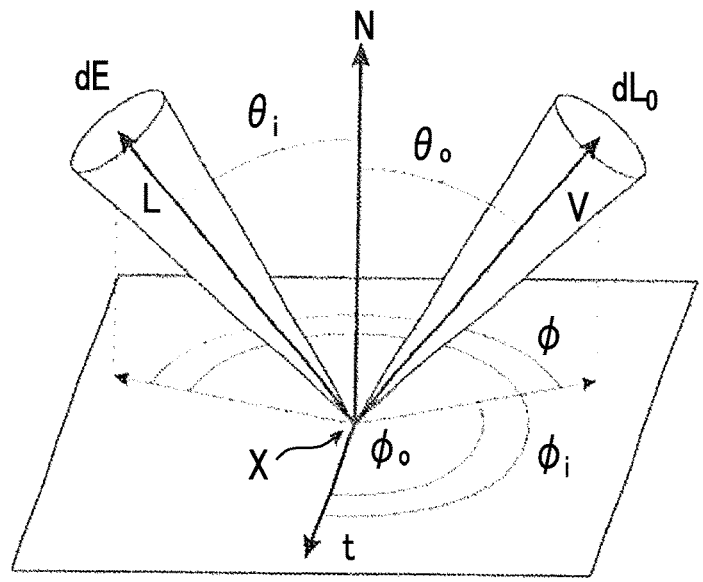
FIG. 7 is an explanatory diagram illustrating a geometric condition in which a Lambert virtual model is applied.

The image information of an object having a glossy or rugged surface is expressed by using a bidirectional reflectance distribution function (BRDF). In a case where light is applied to a surface of an object, the light is specularly reflected at the surface of the object, transmitted through the object to be absorbed, or scattered to be emitted from the surface. FIG. 7 illustrates a geometric condition of the bidirectional reflectance distribution function (BRDF). The BRDF is a function representing a ratio of radiance $dL_0$ of reflected light at a minute solid angle in a visual line direction V to irradiance dE of light incident at a minute solid angle in a light source direction L at a certain location x on a reflection surface. The BRDF is generally measured by a meter such as a goniophotometer that can change an incidence angle or a light reception angle. This measured value is called an actually measured BRDF.

In FIG. 7, $\theta_i$ is an angle formed between incident light and a normal vector N at the location x on the reflection surface, $\theta_o$ is an angle formed between reflected light and the normal vector N at the location x on the reflection surface, $\varphi_i$ is an angle formed between the incident light and a tangent vector t at the location x on the reflection surface, and $\varphi_o$ is an angle formed between the reflected light and a tangent vector t at the location x on the reflection surface.

The BRDF is expressed by the following Equation 1.

$$f(x, \theta_i, \phi_i, \theta_o, \phi_o) = \frac{dL_o(\theta_o, \phi_o)}{dE(\theta_i, \phi_i)} \quad (1)$$

Figure 8:
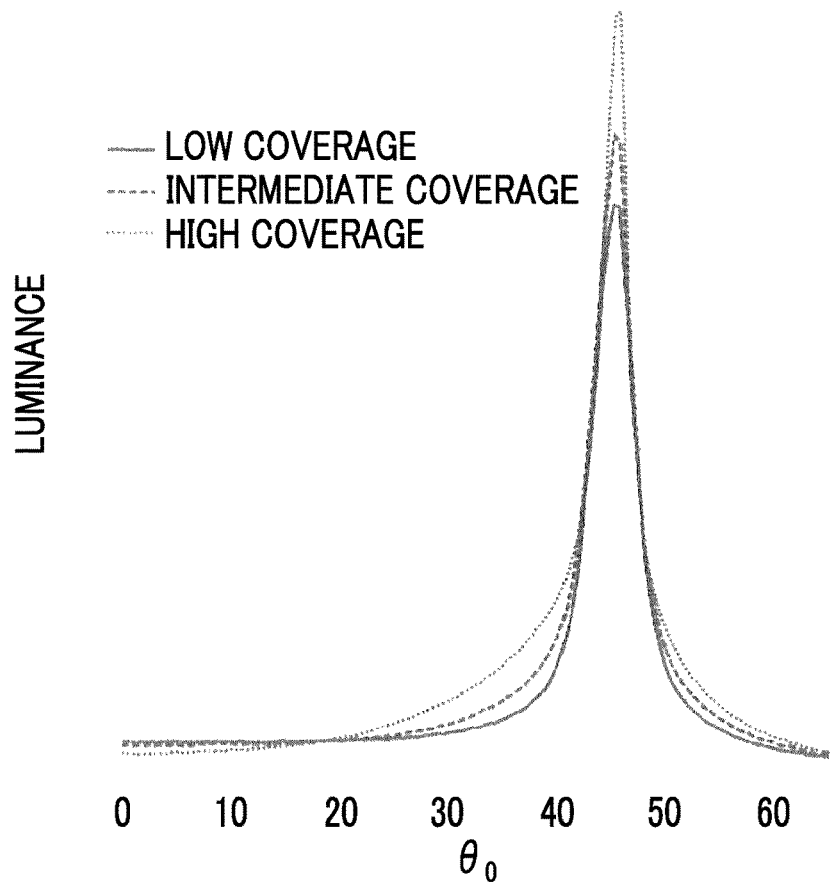
FIG. 8 is a graph showing an actually measured BRDF.

FIG. 8 illustrates an example of an actually measured BRDF of printed matter that is output according to an electrophotographic method by changing a coverage by using silver toner. In FIG. 8, the light source direction vector L and the visual line direction vector V are present on the same plane (no $\varphi$ component), the incidence angle $\theta_i$ is 45°, and a transverse axis expresses a light receiving angle $\theta_0$. In a case where an incidence angle is 45°, a specular reflection angle is 45°.

As is clear from FIG. 8, as a coverage (metallic gloss) of the silver toner becomes higher, the luminance of specularly reflected light is increased.

As a model approximating a way of light reflection at an object surface, a Phong reflection model is used. In the Phong reflection model, reflection at an object surface is approximated to three elements such as ambient light, diffusely reflected light of direct light, and specularly reflected light of direct light.

Figures 9A, 9B:
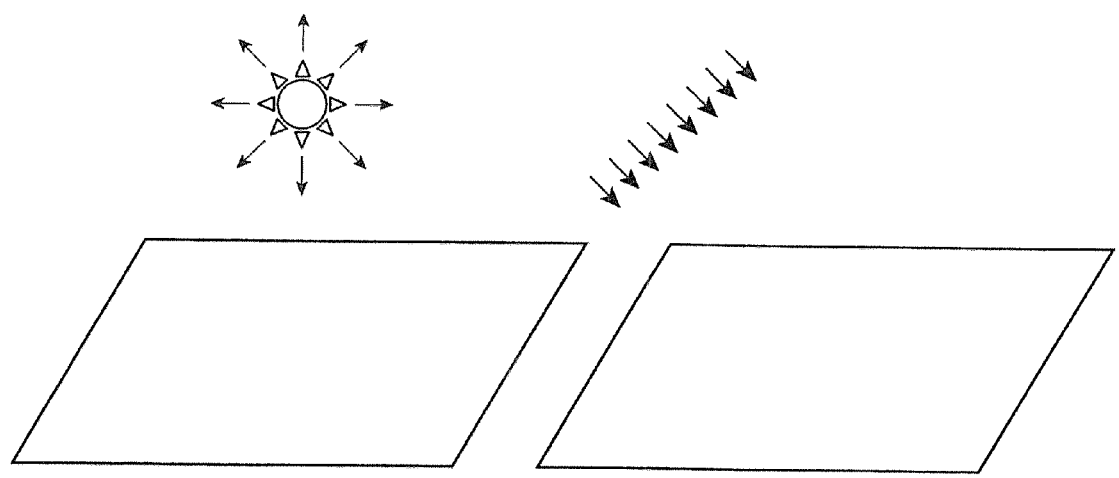
FIGS. 9A and 9B are explanatory diagrams illustrating the types of virtual light sources.

As illustrated in FIGS. 9A and 9B, a light may be classified into a point light source and a parallel light source. The point light source is a light source from which light is spread in all directions from a certain position thereof in a space. The parallel light source is a light source from which light is spread in identical directions at all positions thereof in a space.

The intensity of reflected light from an object is obtained by adding ambient light, diffusely reflected light of direct light, and specularly reflected light of direct light.

$$I_r = I_a + I_d + I_s$$

Here, $I_a$, $I_d$, and $I_s$ respectively indicate the luminance of the ambient light, the diffusely reflected light of the direct light, and the specularly reflected light of the direct light. The ambient light $I_a$ may be handled as a constant.

Figure 10:
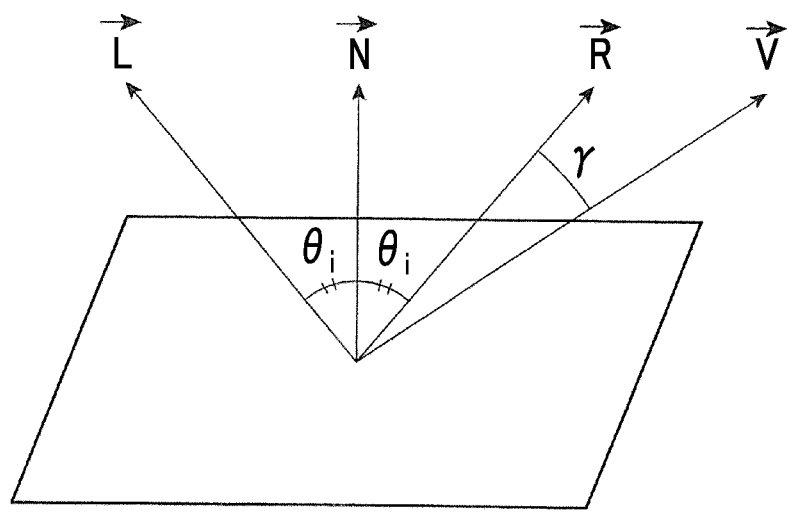
FIG. 10 is an explanatory diagram illustrating a geometric condition in which a Phong virtual model is applied.

The intensity of the diffusely reflected light from an object is known to conform to the Lambert's cosine law. The Lambert's cosine law is that a radiant intensity for reflection from a minute surface is proportional to cosine of the incidence angle $\theta_i$ between a surface normal and a light beam as shown in the following equation. FIG. 10 is a diagram illustrating the Lambert's cosine law and a geometric condition in the Phong reflection model described below.

$$I = I_i \cdot (\rho_d \cos \theta_i)$$

Here, $I_i$ is the intensity of incident light, $\rho_d$ is a diffuse reflectance, and $\theta_i$ is an incidence angle.

Figure 11:
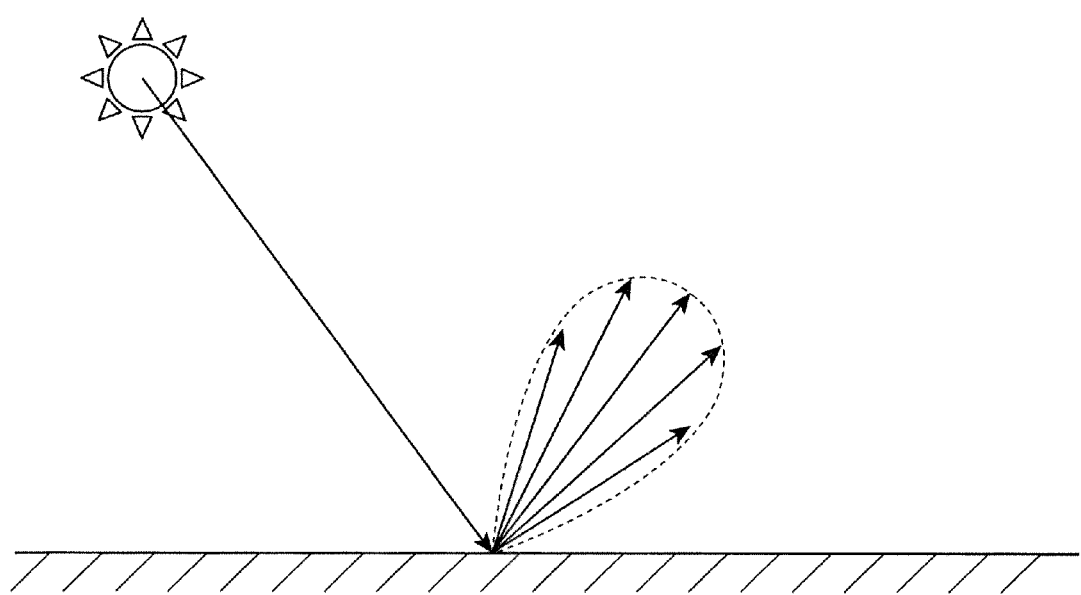
FIG. 11 is a schematic diagram illustrating specular reflection.

The intensity of the specularly reflected light from an object indicates reflection occurring at a smooth surface of metal or plastic. Light is reflected only in a specular reflection direction of an incidence angle at a complete mirror surface, but, as illustrated in FIG. 11, light is spread in a range centering on the specular reflection direction in an actual object.

In the Phong reflection model, the radiant intensity I of the specularly reflected light is approximated as follows.

$$I = I_i \cdot (\rho_s \cdot \cos^n \gamma)$$

Here, $\rho_s$ is a specular reflectance, n (where n≥1) is a specular reflection index, and $\gamma$ is an angle formed between a specular reflection direction and a visual line direction.

Therefore, the intensity of reflected light from an object is obtained by adding diffusely reflected light of direct light and specularly reflected light of the direct light, and is represented by the following equation.

$$I = I_i \cdot (\rho_d \cos \theta_i) + I_i \cdot (\rho_s \cdot \cos^n \gamma)$$

In this equation, a greater value is obtained as the angle $\gamma$ is reduced. As a value of n becomes greater, a value for the angle $\gamma$ is steeply reduced.

In the reflection model, respective parameters such as the diffuse reflectance $\rho_d$, the specular reflectance $\rho_s$, and the specular reflection index n are obtained on the basis of image data of a diffuse reflection image and a specular reflection image output from the texture scanner 6.

Figure 12:
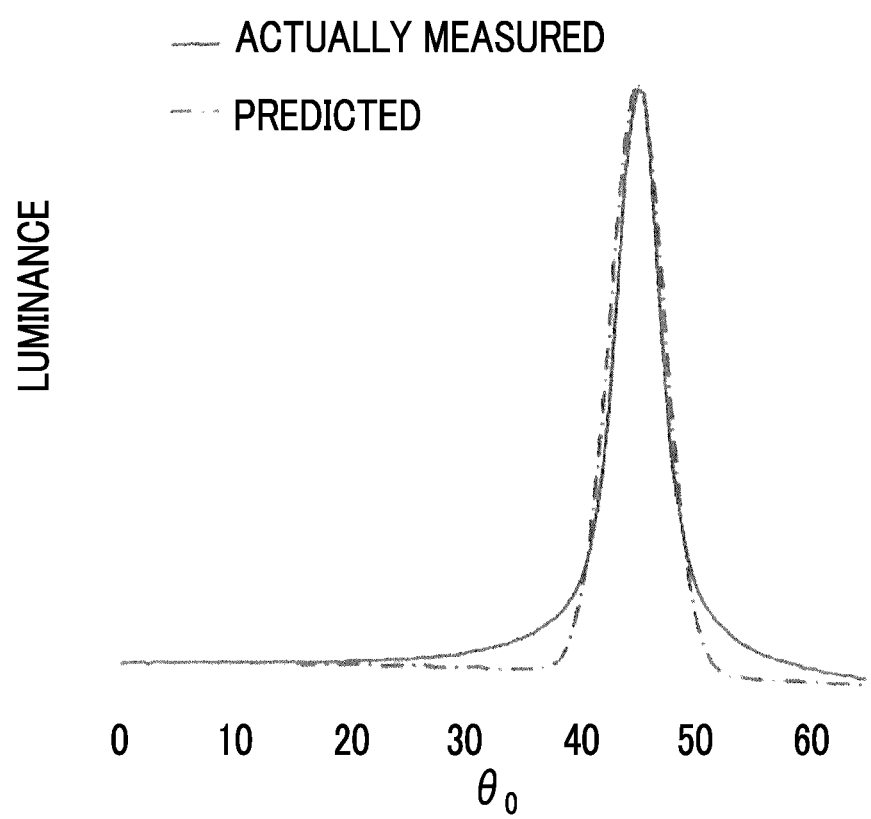
FIG. 12 is a graph showing a predicted BRDF fitted to an actually measured BRDF in a case of a low coverage illustrated in FIG. 8 in an example of estimating a parameter in a reflection model.

FIG. 12 illustrates an example of estimating a parameter in the reflection model, and illustrates a predicted BRDF fitted to an actually measured BRDF in a case of the low coverage illustrated in FIG. 8. As is clear from FIG. 12, a parameter is estimated and determined as appropriate on the basis of an output from the texture scanner 6 in the reflection model, and is fitted to a BRDF of the actually measured low coverage.

Meanwhile, a display apparatus 20 according to Exemplary Embodiment 1 is configured as follows.

The display apparatus 20 can three-dimensionally display an image of an object having a glossy or rugged surface by using 3DCG.

Prior to display of an image of an object having a glossy or rugged surface, the display apparatus 20 calculates a reflectance distribution function for the planar object 10 on the basis of image data of a diffuse reflection image and a specular reflection image of the planar object 10 read by using the texture scanner 6.

Figure 13:
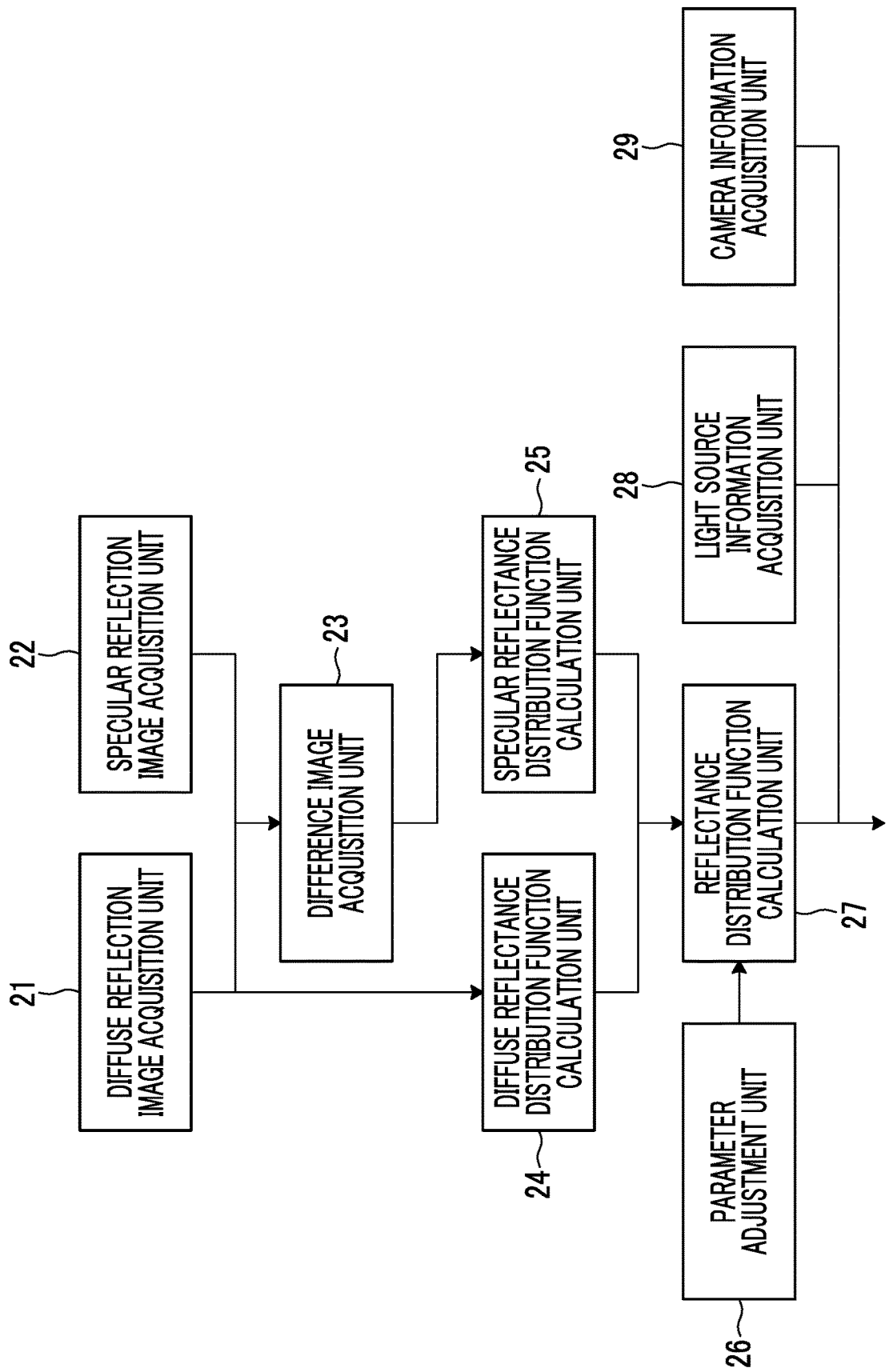
FIG. 13 is a block diagram illustrating constituents of the display apparatus according to Exemplary Embodiment 1 of the present invention.

FIG. 13 is a block diagram illustrating processing of calculating a reflectance distribution function for the planar object 10 on the basis of image data of a diffuse reflection image and a specular reflection image of the planar object 10 read by using the texture scanner 6.

As illustrated in FIG. 13, the reflectance distribution function calculation process includes a diffuse reflection image acquisition unit 21, a specular reflection image acquisition unit 22, a difference image acquisition unit 23, a diffuse reflectance distribution function calculation unit 24, a specular reflectance distribution function calculation unit 25, a parameter adjustment unit 26, a reflectance distribution function calculation unit 27, a light source information acquisition unit 28, and a camera information acquisition unit 29.

The diffuse reflection image acquisition unit 21 and the specular reflection image acquisition unit 22 respectively acquire a diffuse reflection image and a specular reflection image obtained by the texture scanner 6. The diffuse reflection image acquisition unit 21 and the specular reflection image acquisition unit 22 may be connected to the texture scanner 6 so as to acquire the images from the texture scanner 6, or may acquire the images from the server apparatus 4 that is connected to the texture scanner 6 via the network 3.

The difference image acquisition unit 23 calculates a difference between the diffuse reflection image and the specular reflection image to acquire a difference image. The difference image acquisition unit 23 calculates the difference image corresponding to (the specular reflection image−the diffuse reflection image).

The diffuse reflectance distribution function calculation unit 24 calculates a diffuse reflectance distribution function for the planar object 10 by using the diffuse reflection image. For example, the diffuse reflectance distribution function calculation unit 24 calculates $\rho_d \cdot \cos\theta_i$ as a diffuse reflectance distribution function by using $\rho_d$ as a diffuse reflectance for incident light and $\theta_i$ as an incidence angle according to the Lambert's cosine law, and calculates the diffuse reflectance $\rho_d$ as a parameter on the basis of the diffuse reflection image.

The specular reflectance distribution function calculation unit 25 calculates a specular reflectance distribution function for the planar object 10 by using the difference image. For example, the specular reflectance distribution function calculation unit 25 calculates $\rho_s \cdot \cos^n \gamma$ as a specular reflectance distribution function by using $\rho_s$ as a specular reflectance, $\gamma$ as an angle formed between a specular reflection direction and a visual line direction, and n as a specular reflection index according to the Phong reflection model, and calculates the specular reflectance $\rho_s$ as a parameter on the basis of the difference image.

The reflectance distribution function calculation unit 27 calculates a reflectance distribution function for each pixel of the planar object 10 by using the diffuse reflectance distribution function calculated by the diffuse reflectance distribution function calculation unit 24 and the specular reflectance distribution function calculated by the specular reflectance distribution function calculation unit 25. For example, the reflectance distribution function calculation unit 27 calculates the reflectance distribution function on the basis of the reflectance distribution function=the diffuse reflectance distribution function+the specular reflectance distribution function according to the Lambert's cosine law and the Phong reflection model.

The parameter adjustment unit 26 adjusts various parameters in a case where the reflectance distribution function calculation unit 27 calculates the reflectance distribution function. The light source information acquisition unit 28 acquires information (light source direction) regarding a light source illuminating the planar object 10. The camera information acquisition unit 29 acquires camera information (visual line direction).

The various parameters, the light source information (light source direction), or the camera information (visual line direction) is set as appropriate from the operation unit 203 or the like of the user terminal apparatus 2.

As illustrated in FIG. 4, the display apparatus 20 according to Exemplary Embodiment 1 is configured to include the acquisition unit 206 that acquires an image including a surface reflection component of an object; the generation unit 207 that generates images of the object when the object is viewed at plural angles such that an angle of the object with respect to a virtual light source is changed on the basis of the image of the object acquired by the acquisition unit 206; the selection unit 208 that selects an image of the object viewed at a first angle among the images of the object generated by the generation unit 207; the conversion unit 209 that converts the image of the object selected by the selection unit 208 into an image of the object viewed at a second angle that is different from the first angle in a state in which a positional relationship between the virtual light source and the object is maintained; the display unit 205 that displays the image of the object obtained through conversion in the conversion unit 209; and the storage unit 202 that stores various pieces of image data.

The acquisition unit 206 acquires a diffuse reflection image and a specular reflection image obtained by the texture scanner 6, and further acquires a color image. The acquisition unit 206 performs a process of calculating a reflectance distribution function as described above on the basis of the diffuse reflection image and the specular reflection image obtained by the texture scanner 6. Information regarding the diffuse reflection image, the specular reflection image, and the color image acquired by the acquisition unit 206 is temporarily stored in the storage unit 202.

The generation unit 207 generates images of the object when the object is viewed at plural angles such that an angle of the object with respect to the virtual light source is changed on the basis of the images of the object acquired by the acquisition unit 206.

Figure 14:
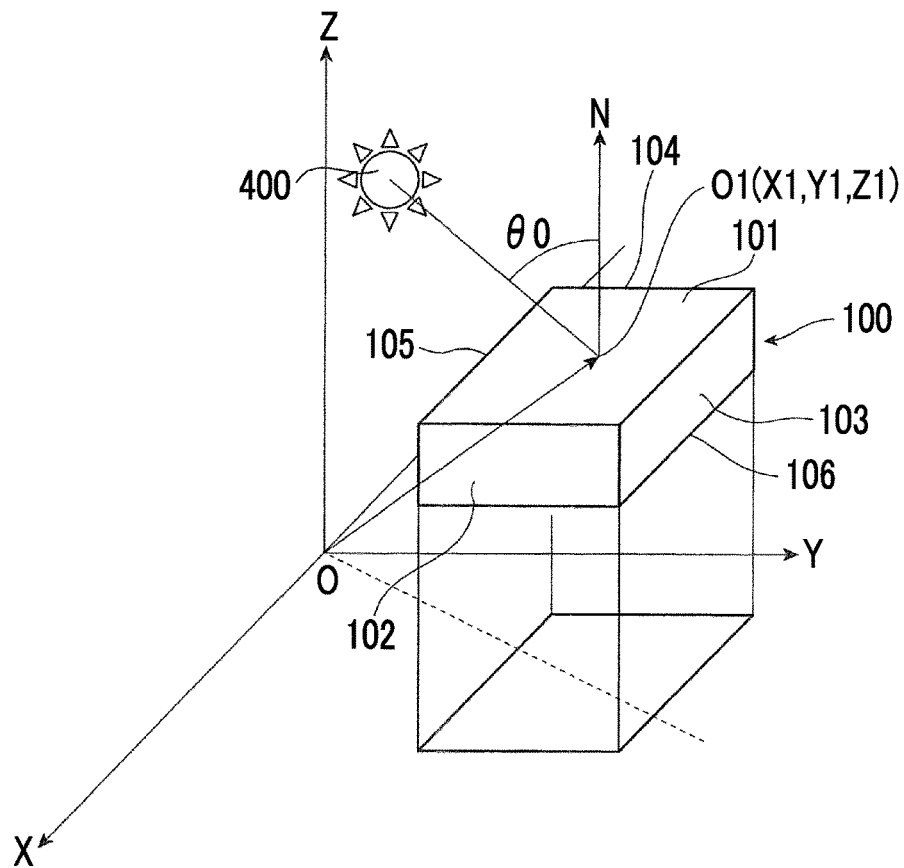
FIG. 14 is a perspective configuration view illustrating three-dimensional disposition of an object.

Specifically, as illustrated in FIG. 14, the generation unit 207 generates an image in which the image of the object acquired by the acquisition unit is attached to a front surface (upper end surface) of a rectangular parallelepiped object 100 disposed in a world coordinate system by using the 3DCG program.

A two-dimensional image may be used as the image of the object acquired by the acquisition unit 206 without being changed, but, herein, the image in which the two-dimensional image is attached to the front surface (upper end surface) of the rectangular parallelepiped is generated such that an inclined state of the two-dimensional image is displayed to be easily understandable.

A point light source is disposed at a coordinate (XYZ) in the world coordinate system as the information (light source direction) regarding a light source illuminating the planar object 10, acquired by the light source information acquisition unit 28. The camera information acquisition unit 29 acquires an image in which the rectangular parallelepiped is viewed from a Z axis direction as the camera information (visual line direction).

Figure 15:
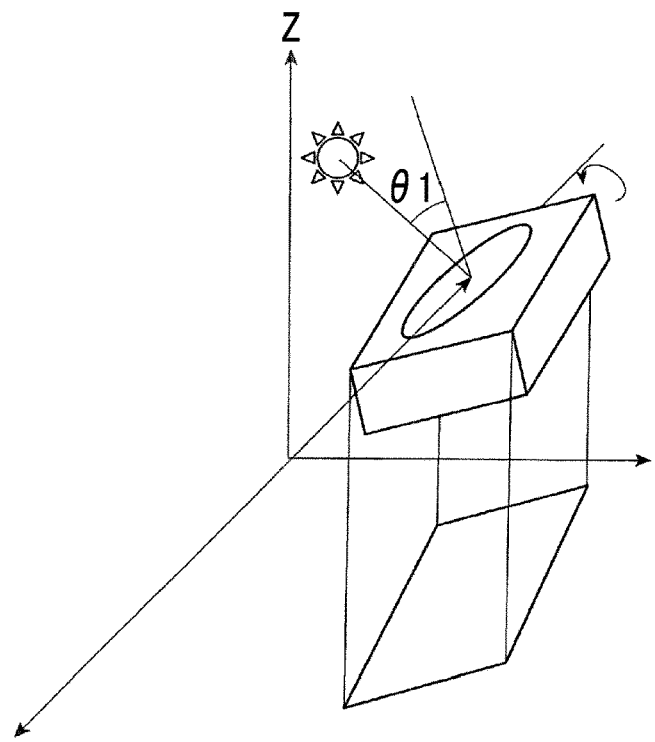
FIG. 15 is a perspective configuration view illustrating three-dimensional disposition of the object.

As illustrated in FIG. 15, the generation unit 207 generates image information in which the image of the rectangular parallelepiped object 100 disposed in the world coordinate system is inclined or rotated at any angle in a direction designated with a mouse as the operation unit 203 of the user terminal apparatus 2, by using the 3DCG program.

Figure 16A:
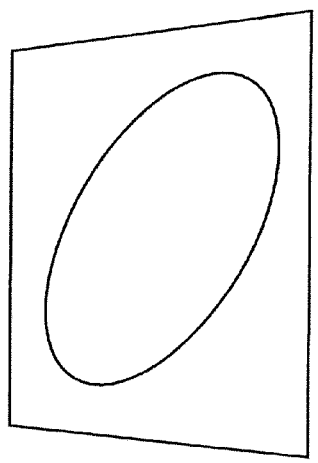
FIGS. 16A and 16B are configuration diagrams illustrating images of the object.
Figure 16B:
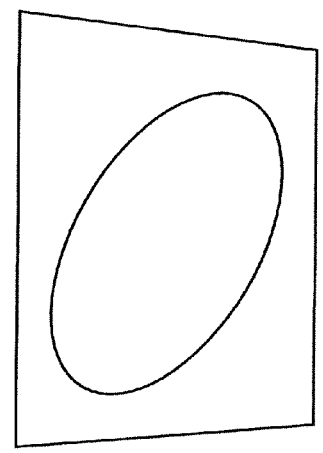

As illustrated in FIGS. 16A and 16B, the image information generated by the generation unit 207 is subjected to a rendering process by using the 3DCG program, and is displayed as a three-dimensional image on the display unit 205 of the user terminal apparatus 2.

The selection unit 208 selects an image of the object viewed at the first angle from among the images of the object 100 generated by the generation unit 207. Here, the first angle is any angle that is selectable by a user. The selection unit 208 is configured with the mouse or the like as the operation unit 203 of the user terminal apparatus 2. A left-click operation is performed on the mouse corresponding to the operation unit 203 of the user terminal apparatus 2 as an example of the selection unit 208 while viewing the images of the object 100 displayed on the display unit of the user terminal apparatus 2, and thus a process of selecting an image of the object viewed at the first angle from among the images of the object generated by the generation unit 207 is executed.

Figure 17:
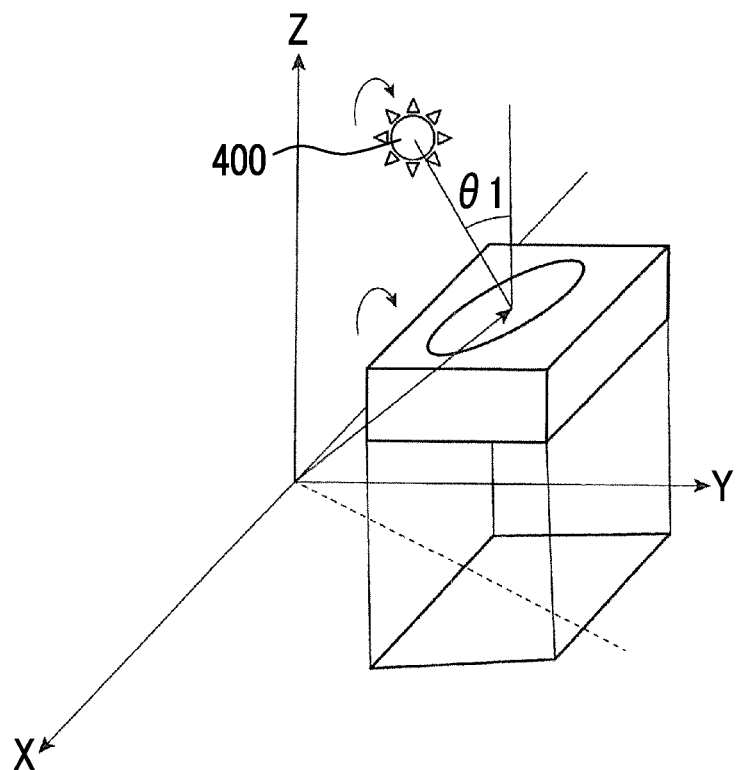
FIG. 17 is a perspective configuration view illustrating three-dimensional disposition of the object.

As illustrated in FIG. 17, the conversion unit 209 converts the image of the object 100 selected by the selection unit 208 into an image of the object viewed at the second angle that is different from the first angle in a state in which a positional relationship between the virtual light source and the object is maintained.

The display apparatus 20 includes a designation unit that designates the second angle. The designation unit is configured with, for example, the mouse or the like as the operation unit 203 of the user terminal apparatus 2. A left-click operation is performed on the mouse corresponding to the operation unit 203 of the user terminal apparatus 2 as an example of the designation unit while viewing the image of the object displayed on the display unit of the user terminal apparatus 2, and a process of moving the mouse is also executed such that the image of the object viewed at the second angle wanted by a user is displayed on the display unit.

An image of the object included in a predefined angle range (for example, ±5 degrees) with respect to the second angle designated by the designation unit is configured to be set as the image of the object viewed at the second angle. More specifically, for example, in a case where the image is to be displayed at an angle inclined by 2.57888° with respect to the horizon, when the image may not be sharply displayed due to a resolution of the display apparatus, and can be clearly displayed at 2.5°, the image is displayed at 2.5°. For example, in a case where an angle approximately perpendicular to a plane of the object is selected, the image may be displayed with an angle perpendicular to a plane that is estimated to be a perpendicular indicated by a user as the second angle.

The selection unit 208 may be configured to automatically select an image of the object of which an image area is the maximum as the image of the object viewed at the second angle. The image of the object viewed at the second angle is, for example, a plane image of the object.

The conversion unit 209 performs a process of converting the image of the object 100 selected by the selection unit 208 into an image of the object viewed at the second angle that is different from the first angle in a state in which a positional relationship between the virtual light source and the object is maintained.

Figure 19:
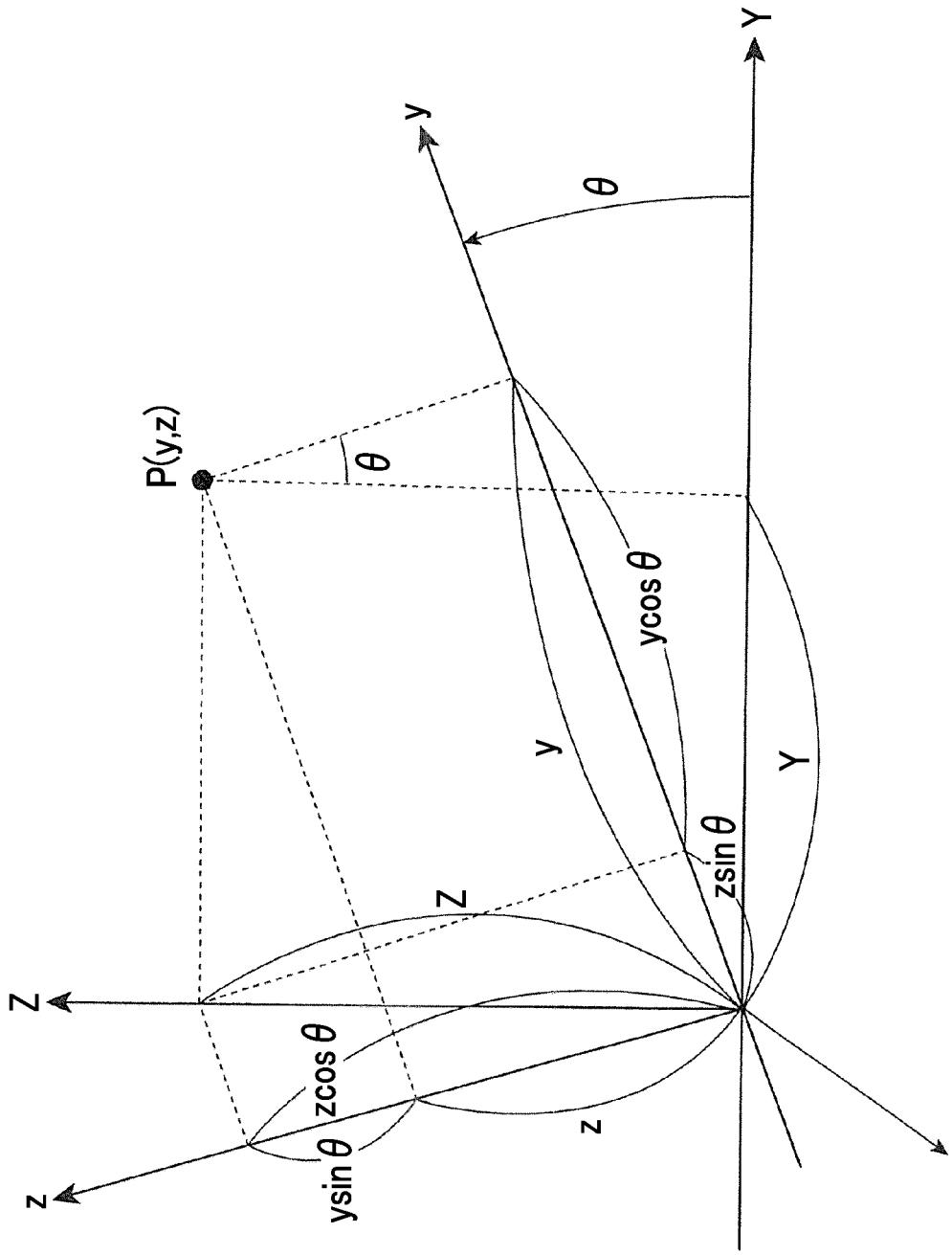
FIG. 19 is an explanatory diagram illustrating rotation of the object.

The process performed by the conversion unit 209 is a rotation process of rotating a coordinate system as illustrated in FIG. 19, and is executed by multiplying a rotation matrix of 4×4 by the (XYZ) coordinate.

The display unit 205 displays images of the object in an intermediate stage, including the image of the object obtained through conversion in the conversion unit 209.

In this case, the display unit 205 may be configured to also display the images of the object generated by the generation unit 207. It is desirable that the display unit 205, for example, also displays a first image in which the object is viewed at the first angle as a selection image among generation images generated by the generation unit 207.

The display unit 205 may be configured to separately display images of the object viewed at plural angles, generated by the generation unit 207. As mentioned above, the display unit 205 separately displays the images of the object viewed at plural angles, generated by the generation unit 207, and thus a user may easily select an image of an object appropriate for the user's preference without being limited to an image having the highest luminance.

The display unit 205 may be configured to display the images of the object viewed at plural angles, generated by the generation unit 207, in a designation order of designating the images. Here, the designation order of designating the images may be an order in which the user sequentially designates the images with the mouse. There may be a configuration in which the luminance of the images of the object is obtained through automatic calculation such that an order of decreasing luminance is designated in advance, and thus the images of the object are displayed in the designated order of decreasing luminance.

The display unit 205 may be configured to rearrange and display the images of the object viewed at plural angles, generated by the generation unit 207 such that change amounts thereof are uniformized. As mentioned above, the images of the object viewed at plural angles, generated by the generation unit 207 are rearranged and displayed such that change amounts thereof are uniformized, and thus a user may easily recognize a change amount of an image of an object and may also easily select an image appropriate for the user's preference.

Operation of Display Apparatus

The display apparatus 20 according to the present exemplary embodiment may display images in which an object is viewed at different angles in a state in which a positional relationship between a virtual light source and the object is maintained.

As illustrated in FIG. 14, a case is assumed in which, in the rectangular parallelepiped object 100 in the world coordinate system (XYZ space), a coordinate of the center O1 of the front surface (upper end surface) 101 is (X1, Y1, Z1), and respective side surfaces 102 to 105 and a bottom surface 106 are disposed in parallel to a YZ plane, a ZX plane, and an XY plane.

As illustrated in FIGS. 20A and 20B, an image 107 that appears to be glossy in an elliptical shape in a state of being obliquely inclined along a diagonal direction is formed at a central part of the front surface 101 of the object 100. The image 107 appears not to glow in a state of not being obliquely inclined, but is glossy because the surface is coated or the image is formed with toner such as silver toner that does not cause irregular reflection and gives strong directivity.

The surrounding is similarly glossy, but, in a state in which only the image 107 appears to be glossy in an elliptical shape due to a relationship with a virtual light source, or in a case where the image is remarkably conspicuous at an angle of a certain virtual light source due to the image being formed of gloss that is different from gloss of the surrounding, the displayed portion appears to be glossy as mentioned above, and is the image 107 glossy in the elliptical shape this time.

The image on the front surface 101 of the object 100 is obtained, for example, by attaching the image read by the texture scanner 6 illustrated in FIG. 1.

The display apparatus 20 according to Exemplary Embodiment 1 displays an image of the object 100 on the display unit 205 of the user terminal apparatus 2 on the basis of color image information for the front surface 101 of the object 100 read by the texture scanner 6, diffuse reflection image information based on diffusely reflected light, and specular reflection image information based on specularly reflected light.

As illustrated in FIG. 13, in the display apparatus 20, the diffuse reflectance distribution function calculation unit 24 calculates a diffuse reflectance distribution function for the planar object 10 on the basis of diffuse reflection image information based on diffusely reflected light, and specular reflection image information based on specularly reflected light at the front surface 101 of the object 100 read by the texture scanner 6.

The diffuse reflectance distribution function calculation unit 24 calculates $\rho_d \cdot \cos \theta_i$ as a diffuse reflectance distribution function by using $\rho_d$ as a diffuse reflectance for incident light and $\theta_i$ as an incidence angle according to the Lambert's cosine law, and calculates the diffuse reflectance $\rho_d$ as a parameter on the basis of the diffuse reflection image.

The specular reflectance distribution function calculation unit 25 calculates a specular reflectance distribution function for the planar object 10 by using the difference image. For example, the specular reflectance distribution function calculation unit 25 calculates $\rho_s \cdot \cos^n \gamma$ as a specular reflectance distribution function by using $\rho_s$ as a specular reflectance, $\gamma$ as an angle formed between a specular reflection direction and a visual line direction, and n as a specular reflection index according to the Phong reflection model, and calculates the specular reflectance $\rho_s$ as a parameter on the basis of the difference image.

The reflectance distribution function calculation unit 27 calculates the reflectance distribution function on the basis of the reflectance distribution function=the diffuse reflectance distribution function+the specular reflectance distribution function.

$$I = I_i \cdot (\rho_d \cdot \cos \theta_i) + I_i \cdot (\rho_s \cdot \cos^n \gamma)$$

As illustrated in FIG. 4, in the display apparatus 20, the acquisition unit 206 performs a process of acquiring the reflectance distribution function as described above.

Figure 21:
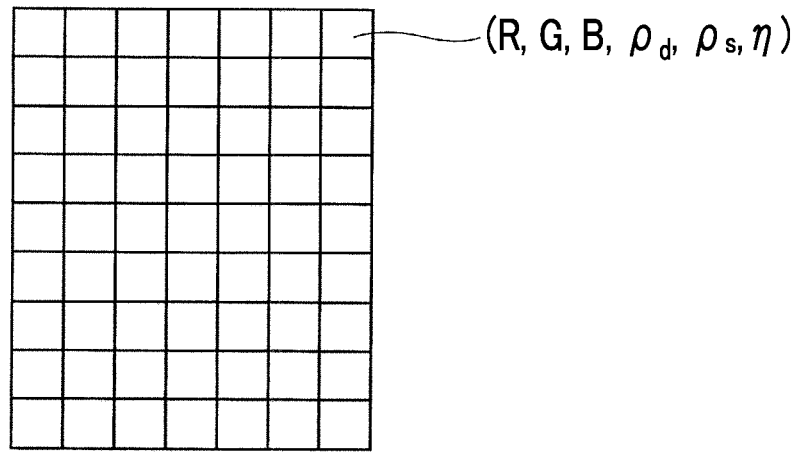
FIG. 21 is an explanatory diagram illustrating an image of the object.

As illustrated in FIG. 21, the reflectance distribution function acquired by the acquisition unit 206 is temporarily stored in the storage unit 202 of the user terminal apparatus 2 for each pixel along with the color image information.

Next, as illustrated in FIG. 15, the generation unit 207 generates images of the object when the object 100 is viewed at plural angles such that an angle of the object 100 with respect to the virtual light source is changed on the basis of the image information for the object 100 temporarily stored in the storage unit 202 of the user terminal apparatus 2. Here, the plural angles also include an angle at which the object 100 is initially viewed.

As illustrated in FIG. 15, the generation unit 207 generates image information in which the image of the rectangular parallelepiped disposed in the world coordinate system is inclined or rotated at any angle in a direction designated with the mouse as the operation unit 203 of the user terminal apparatus 2, by using the 3DCG program.

As illustrated in FIGS. 16A and 16B, the image information generated by the generation unit 207 is subjected to a rendering process by using the 3DCG program, and is displayed as a three-dimensional image on the display unit 205 of the user terminal apparatus 2. The displayed image corresponds to a generation image in the present exemplary embodiment.

Next, a user operates the mouse as an example of the selection unit 208 of the user terminal apparatus 2, and thus selects an image of the object 100 viewed at the first angle from among the images of the object 100 generated by the generation unit 207.

In this case, the user operates the mouse as an example of the selection unit of the user terminal apparatus 2 so as to incline or rotate the image of the object 100, and can thus view an image based on reflected light from the front surface of the object 100 illuminated by a fixed virtual light source 400 as an image displayed on the display unit 205 of the user terminal apparatus 2.

The user inclines the image of the object 100, and thus the elliptical shape portion on the front surface of the object specularly reflects light from the virtual light source such that the specularly reflected light is incident to the camera.

More specifically, the user inclines the image of the object 100, and thus the angle $\theta_i$ and the angle $\gamma$ in the following reflectance distribution function are generally changed.

$$I = I_i \cdot (\rho_d \cdot \cos \theta_i) + I_i \cdot (\rho_s \cdot \cos^n \gamma)$$

Figure 22:
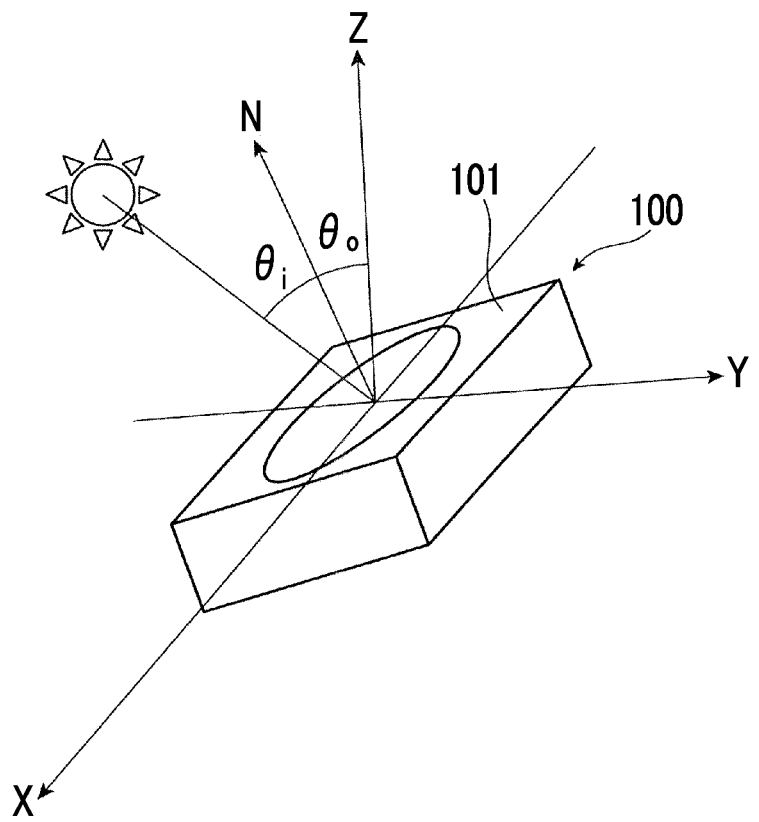
FIG. 22 is a perspective configuration view illustrating three-dimensional disposition of the object.

Then, in FIG. 22, when the object is inclined such that an incidence angle is the same as a reflection angle, the luminance of specularly reflected light from the elliptical shape portion becomes highest. In the present exemplary embodiment, an angular position at which the luminance is highest is set as the first angle, and an image of the object 100 viewed at the angle is selected.

The user designates the second angle by using the mouse as the operation unit 203 of the user terminal apparatus 2.

Next, the conversion unit 209 converts the image of the object 100 selected by the selection unit 208 into an image of the object 100 viewed at the second angle that is different from the first angle in a state in which a positional relationship between the virtual light source 400 and the object 100 is maintained.

Figure 18:
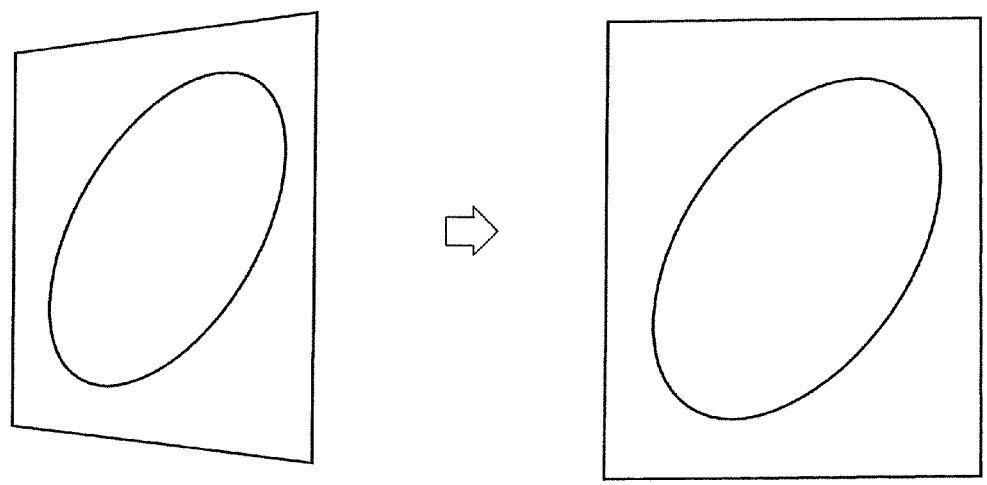
FIG. 18 is a configuration diagram illustrating an image of the object.

As illustrated in FIG. 18, the image of the object 100 obtained through conversion in the conversion unit 209 is displayed on the display unit 205 of the user terminal apparatus 2.

As mentioned above, the display apparatus 20 according to Exemplary Embodiment 1 may display images in which the object is viewed at different angles in a state in which a positional relationship between the virtual light source 400 and the object 100 is maintained.

In the present exemplary embodiment, an angular position at which the luminance is highest is designated as the first angle, but, in a case where an excessive glaring feeling is not wanted, an angular position at which the luminance is not too high may be designated as the first angle.

The second angle may be designated before the first angle is selected, or may be designated in the first place before an object is displayed at plural angles.

For example, in a case where plural objects are respectively displayed at certain angles, one object of the objects is selected, and gloss of a displayed object is wanted to be changed, an angle when the object is displayed along with other objects may be designated in advance as the second angle.

Plural angles are changed by using the mouse in the present exemplary embodiment, but, in a case of a display apparatus of a type of being gripped with the hand, a generation image may be changed by inclining the display apparatus.

In a case where a conversion image and a generation image are displayed together on the display apparatus, the generation image may be changed such that a display angle thereof is changed by detecting an inclination of the mouse or the display apparatus, and the conversion image may not be changed.

Exemplary Embodiment 2

FIGS. 23 and 24A to 24C illustrate a display apparatus according to Exemplary Embodiment 2. In the display apparatus according to Exemplary Embodiment 2, a generation unit is configured to generate an image added with a gloss component multiplied by a coefficient α having a slope corresponding to a region of an object surface in a case of generating images of the object when the object is viewed at plural angles such that an angle of the object with respect to a virtual light source is changed.

In the display apparatus according to Exemplary Embodiment 2, the slope corresponding to the region of the object surface is configured to include a linear parallel slope corresponding to a surface light source and a concentric slope corresponding to a point light source.

Figure 23:
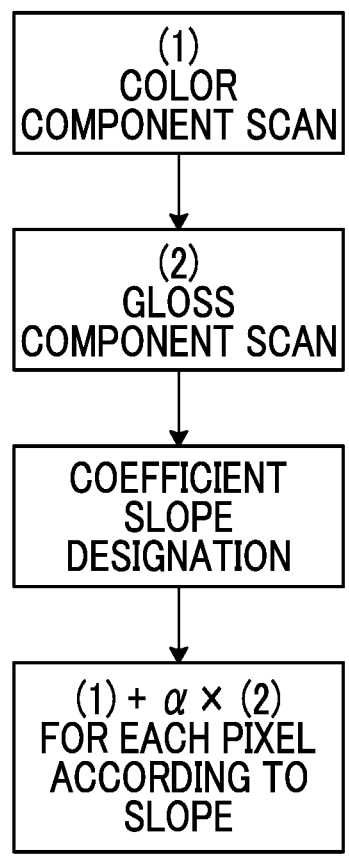
FIG. 23 is a block diagram illustrating constituents of a display apparatus according to Exemplary Embodiment 2 of the present invention.

In other words, in the display apparatus 20 according to Exemplary Embodiment 2, as illustrated in FIG. 23, among images of an object read by the texture scanner 6, the coefficient (slope) a by which a diffuse reflection image and a specular reflection image indicating a gloss component are multiplied according to the type of virtual light source is configured to be designated. The coefficient (slope) a is designated by the parameter adjustment unit 26.

Figure 24A:
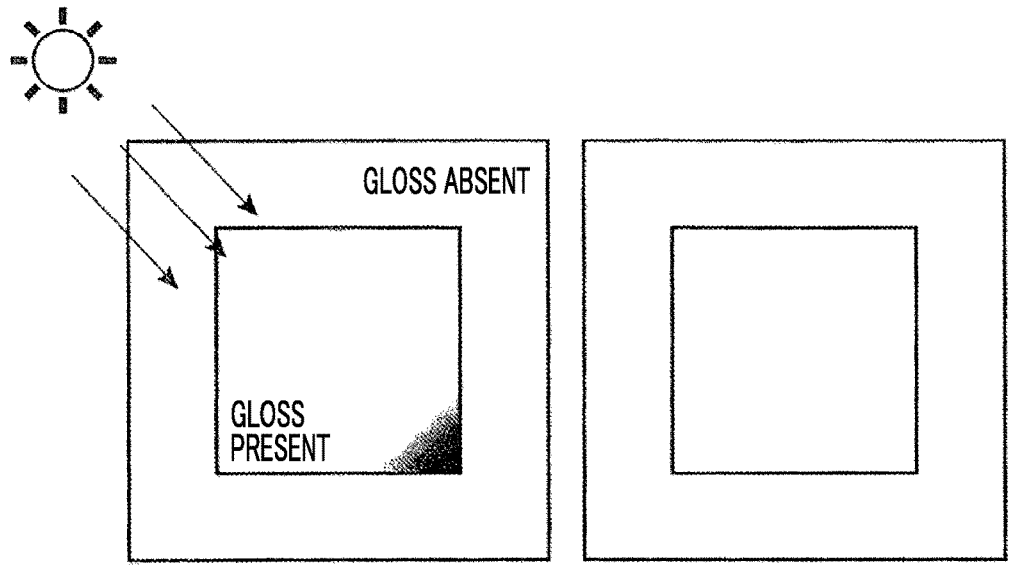
FIGS. 24A to 24C are explanatory diagrams illustrating images of an object displayed on the display apparatus according to Exemplary Embodiment 2 of the present invention.
Figure 24B:
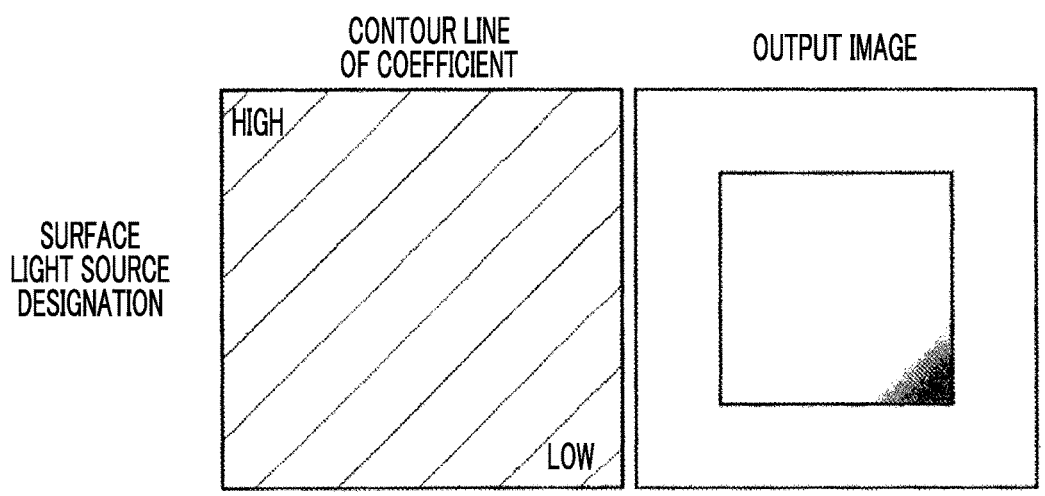

As illustrated in FIG. 24A, in a case where a point light source as the virtual light source 400 is present at a certain distance obliquely upward from the planar object 100, as illustrated in FIG. 24B, plural contour lines parallel to each other are provided in a direction orthogonal to a light beam from the virtual light source 400 such that an end part of the planar object 100 close to the virtual light source 400 has relatively high glossiness, and an end part thereof separated from the virtual light source 400 has relatively low glossiness, and the coefficient (slope) a is designated such that the glossiness gradually decreases according to the plural contour lines.

Figure 24C:
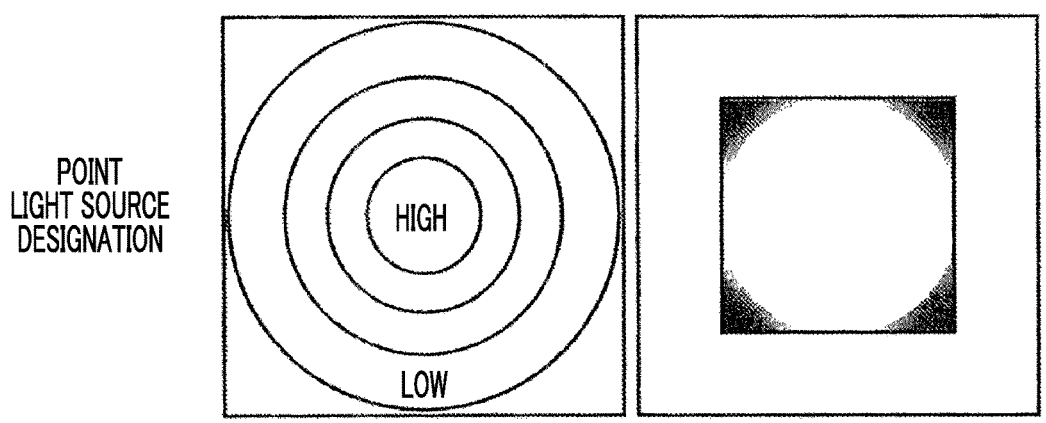

As illustrated in FIG. 24C, in a case where a point light source as the virtual light source 400 is present at a certain distance over a central part of the planar object 100, plural concentric contour lines are provided centering on a perpendicular line drawn onto the planar object 100 from the virtual light source 400, and the coefficient (slope) a is designated such that the glossiness gradually decreases toward the outer circumference from the center according to the plural contour lines.

In the above-described way, more natural gloss may be displayed than in a case where gloss is displayed according to the type of virtual light source 400.

Other configurations and operations are the same as in Exemplary Embodiment 1, and thus description thereof will not be repeated.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display apparatus comprising:
 a processor, configured to:
  generate generation images when a virtual object is viewed at a plurality of angles such that an angle of the object with respect to a virtual light source is changed on the basis of an image of the object;
  select a first image in which the object is viewed at a first angle from among the generation images, as a selection image;
  convert the first image into a conversion image in which the object is viewed at a second angle that is different from the first angle in a state in which a positional relationship including an incident angle of the virtual light between the virtual light source and the object in the first image is maintained; and
  automatically designate an image of the object of which an image area is the maximum as the image of the object viewed at the second angle; and
 a display unit that displays the conversion image.

2. The display apparatus according to claim 1, further comprising:
 an operation unit configured to designate the second angle.

3. The display apparatus according to claim 2,
 wherein an image of the object included in a predefined angle range with respect to the second angle designated by the operation unit is used as the image of the object viewed at the second angle.

4. The display apparatus according to claim 3,
 wherein the image of the object viewed at the second angle is a plane image of the object.

5. The display apparatus according to claim 1,
 wherein the display apparatus includes aa virtual light source which includes a point light source and a light source for parallel light.

6. The display apparatus according to claim 1,
 wherein the display unit also displays the selection image.

7. The display apparatus according to claim 1,
 wherein the display unit displays the generation images viewed at the plurality of angles.

8. The display apparatus according to claim 7,
 wherein the display unit displays the generation images viewed at the plurality of angles in a designation order in which the generation images are designated.

9. The display apparatus according to claim 7,
 wherein the display unit rearranges and displays the generation images viewed at the plurality of angles such that change amounts of the generation images are uniformized.

10. The display apparatus according to claim 1,
 wherein the processor is further configured to generate an image added with a gloss component multiplied by a coefficient having a slope corresponding to a region of a surface of the object in response to the generation images of the object when the object is viewed at the plurality of angles such that the angle of the object with respect to the virtual light source is changed.

11. The display apparatus according to claim 10,
 wherein the slope corresponding to the region of the surface of the object includes a linear parallel slope corresponding to a surface light source and a concentric slope corresponding to a point light source.

12. The display apparatus according to claim 1, wherein the image includes a specular reflection image, a diffuse reflection image and a color image of the object which are obtained while the relative position between a light source and a sensor remains the same.

* * * * *